(12) United States Patent     (10) Patent No.: US 9,323,930 B1
Satish     (45) Date of Patent: Apr. 26, 2016

(54) SYSTEMS AND METHODS FOR REPORTING SECURITY VULNERABILITIES

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/462,833

(22) Filed: Aug. 19, 2014

(51) Int. Cl.
    *G06F 21/56*     (2013.01)
    *H04L 29/06*     (2006.01)

(52) U.S. Cl.
    CPC ............ *G06F 21/56* (2013.01); *H04L 63/1433* (2013.01); *H04L 63/308* (2013.01)

(58) Field of Classification Search
    CPC .......................... H04L 63/1433; H04L 63/308
    See application file for complete search history.

(56) References Cited

U.S. PATENT DOCUMENTS

| | | | | |
|---|---|---|---|---|
| 7,690,038 | B1 * | 3/2010 | Ko | H04L 63/1425 726/24 |
| 7,996,374 | B1 * | 8/2011 | Jones | G06Q 10/10 707/694 |
| 8,875,284 | B1 * | 10/2014 | Newstadt | H04L 63/1425 726/22 |
| 2003/0101360 | A1 * | 5/2003 | Legros | G06F 21/31 726/6 |
| 2006/0031938 | A1 * | 2/2006 | Choi | G06F 21/552 726/25 |
| 2006/0053490 | A1 * | 3/2006 | Herz | H04L 63/1433 726/23 |
| 2006/0059558 | A1 * | 3/2006 | Selep | H04L 63/02 726/23 |
| 2006/0095965 | A1 * | 5/2006 | Phillips | H04L 63/1441 726/22 |
| 2006/0095971 | A1 * | 5/2006 | Costea | G06F 21/56 726/26 |
| 2007/0250928 | A1 * | 10/2007 | Boney | G06F 21/56 726/24 |
| 2009/0172815 | A1 * | 7/2009 | Gu | G06F 21/552 726/23 |
| 2010/0205014 | A1 * | 8/2010 | Sholer | G06Q 40/08 705/4 |
| 2010/0250509 | A1 * | 9/2010 | Andersen | G06Q 10/10 707/705 |
| 2012/0102568 | A1 * | 4/2012 | Tarbotton | G06F 21/552 726/23 |

(Continued)

OTHER PUBLICATIONS

Wylie Shanks; Enhancing incident response through forensic, memory analysis and malware sandboxing techniques; SANS Institute, Mar. 25, 2014.*

Hun-Ya Lock; Using IOC (Indicators of Compromise) in Malware Forensics; SANS Institute; Feb. 21, 2013.*

(Continued)

*Primary Examiner* — James Turchen
(74) *Attorney, Agent, or Firm* — ALG Intellectual Property, LLC

(57) ABSTRACT

A computer-implemented method for reporting security vulnerabilities may include (1) detecting that a malware application is present on an endpoint computing system, (2) determining a window of time during which the malware application was present in a specified condition on the endpoint computing system, (3) logging a list of sensitive data items accessed during the window of time, and (4) conditioning performance of a security action to report the list of sensitive data items on a determination that both (A) a length of the window of time is longer than a security threshold length and is indicative of the malware application being located on the endpoint computing system long enough to potentially compromise a sensitive data item and (B) the malware application was accessed during the window of time. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2013/0160124 A1* | 6/2013 | St Hlberg | G06F 21/554 | 726/24 |
| 2013/0298244 A1* | 11/2013 | Kumar | G06F 21/52 | 726/25 |
| 2014/0237599 A1* | 8/2014 | Gertner | H04L 63/1425 | 726/24 |
| 2014/0259095 A1* | 9/2014 | Bryant | H04L 63/20 | 726/1 |
| 2014/0380474 A1* | 12/2014 | Paithane | G06F 21/566 | 726/23 |

OTHER PUBLICATIONS

Richard Lippmann et al; The Effect of Identifying Vulnerabilities and Patching Software on the Utility of Network Intrusion Detection; Recent Advances in Intrusion Detection, 5th International Symposium, RAID 2002.*

Ashvin Goel et al; The Taser Intrusion Recovery System; ACM; SOSP'05, Oct. 23-26, 2005.*

"Personally identifiable information", http://en.wikipedia.org/wiki/Personally_identifiable_information, as accessed Jun. 19, 2014, Wikipedia, (Jun. 24, 2005).

* cited by examiner

SYSTEMS AND METHODS FOR REPORTING SECURITY VULNERABILITIES

BACKGROUND

Individuals and organizations seek to protect their computing resources from the threat of malware and other security breaches. To protect these computing resources, organizations will often employ security and antivirus software products. For example, a corporation may require every user computing device to keep an antivirus product installed and running to monitor activity for security threats.

Over time, security and antivirus products may actually detect security threats. For example, the products may identify a malware executable that disguises itself with a file name that appears to be safe (e.g., firefox.exe). In response to detecting the security threat, the products may resolve the threat by removing, quarantining, or otherwise disabling the malware executable.

Although security and antivirus products may successfully protect users from some security threats, they may nevertheless leave users with unanswered questions about the extent of the security breach. For example, the user may wonder what specifically the malware application did and/or what specific resources were potentially compromised. The security products may also provide an incomplete list of remedial actions for the user or others to take. Accordingly, the instant disclosure identifies and addresses a need for additional and improved systems and methods for reporting security vulnerabilities.

SUMMARY

As will be described in greater detail below, the instant disclosure generally relates to systems and methods for reporting security vulnerabilities by, for example, (1) identifying a window of time during which a malware application was present, (2) determining that the window of time satisfies a security threshold length, and (3) reporting a list of sensitive data items that may have been compromised by the malware application. In one example, a computer-implemented method for reporting security vulnerabilities may include (1) detecting that a malware application is present on an endpoint computing system, (2) determining a window of time during which the malware application was present in a specified condition on the endpoint computing system, (3) logging a list of sensitive data items accessed during the window of time, and (4) conditioning performance of a security action to report the list of sensitive data items on a determination that both (A) a length of the window of time is longer than a security threshold length and is indicative of the malware application being located on the endpoint computing system long enough to potentially compromise a sensitive data item and (B) the malware application was accessed during the window of time.

In some examples, conditioning performance of the security action further may include determining that a condition is not satisfied. In some examples, determining that the condition is not satisfied may include determining that the length of the window of time is not longer than the security threshold length. In further examples, determining that the condition is not satisfied may include determining that the application was not accessed during the window of time.

In some examples, the computer-implemented method may further include reporting to a user, in response to determining that at least one condition is not satisfied, both: (1) the detection of the malware application and (2) a safety message indicating that the user has a measure of safety from the malware application. In further examples, conditioning performance of the security action may include determining that (1) the length of the window of time is longer than the security threshold length and (2) the application was accessed during the window of time.

In one embodiment, the list of sensitive data items may include a list of protected resources into which a user logged. In further examples, the security action to report the list of sensitive data items may include informing the user to change security credentials for each of the protected resources into which the user logged.

In one embodiment, the list of sensitive data items may include a list of documents with which a user interacted. In further examples, the security action to report the list of sensitive data items may include informing the user that the documents in the list of documents were potentially compromised by the malware application.

In one embodiment, the security action to report the list of sensitive data items may include scanning documents in the list of documents for personally identifiable information. In further examples, scanning documents in the list of documents for personally identifiable information may include scanning the documents for information that is structured according to a format for a type of personally identifiable information. The format for the type of personally identifiable information may include (1) a structure of a credit card number, (2) a structure of a social security number, (3) a structure of an address, (4) a structure of a phone number, and/or (5) a structure of a date of birth. In further examples, scanning documents in the list of documents for personally identifiable information may include scanning the documents for specific personally identifiable information known to apply to the user. In another embodiment, the security action to report the list of sensitive data items may include reporting a list of remedial actions that a user may take to protect the user in response to detection of the malware application.

In one embodiment, a system for implementing the above-described method may include (1) a detection module, stored in memory, that detects that a malware application is present on an endpoint computing system, (2) a determination module, stored in memory, that determines a window of time during which the malware application was present in a specified condition on the endpoint computing system, (3) a logging module, stored in memory, that logs a list of sensitive data items accessed during the window of time, (4) a conditioning module, stored in memory, that conditions performance of a security action to report the list of sensitive data items on a determination that both (A) a length of the window of time is longer than a security threshold length and is indicative of the malware application being located on the endpoint computing system long enough to potentially compromise a sensitive data item and (B) the malware application was accessed during the window of time, and (5) at least one physical processor configured to execute the detection module, the determination module, the logging module, and the conditioning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect that a malware application is present on an endpoint computing system, (2) determine a window of time during which the malware application was present in a specified condition on the endpoint computing system, (3) log a list of sensitive data items accessed during the window of time, and (4) condition performance of a security action to report the list of sensitive data items on a determination that both (A) a length of the window of time is longer than a security threshold length and is indicative of the malware application being located on the endpoint computing system long enough to potentially compromise a sensitive data item and (B) the malware application was accessed during the window of time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
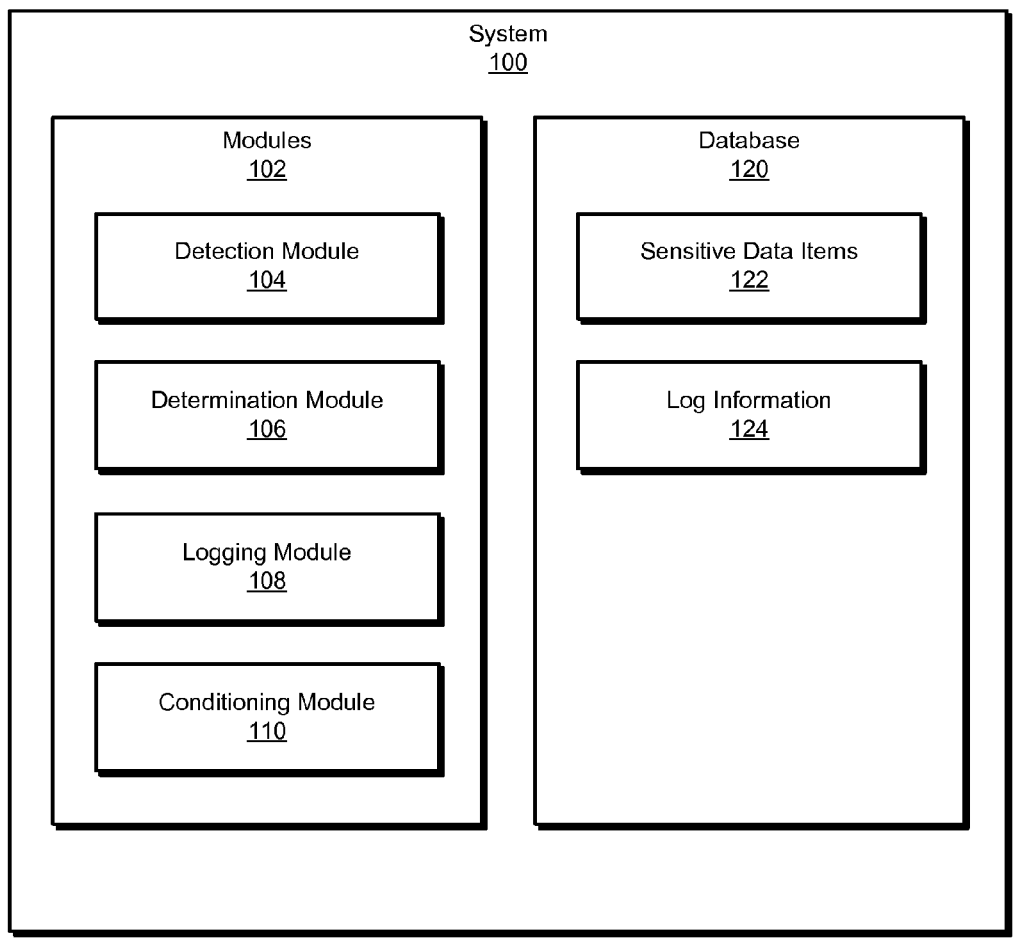
FIG. 1 is a block diagram of an exemplary system for reporting security vulnerabilities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for reporting security vulnerabilities. As will be explained in greater detail below, the disclosed systems and methods may provide more comprehensive information to a user about detected security events. For example, the disclosed systems and methods may provide techniques for suggesting that users update, or otherwise protect, security credentials and/or personally identifiable information. Moreover, the disclosed systems and methods may intelligently condition the reporting of these suggestions on the satisfaction of two conditions, as discussed below, which together indicate that the updating may be appropriate to maintain security.

Figure 2:
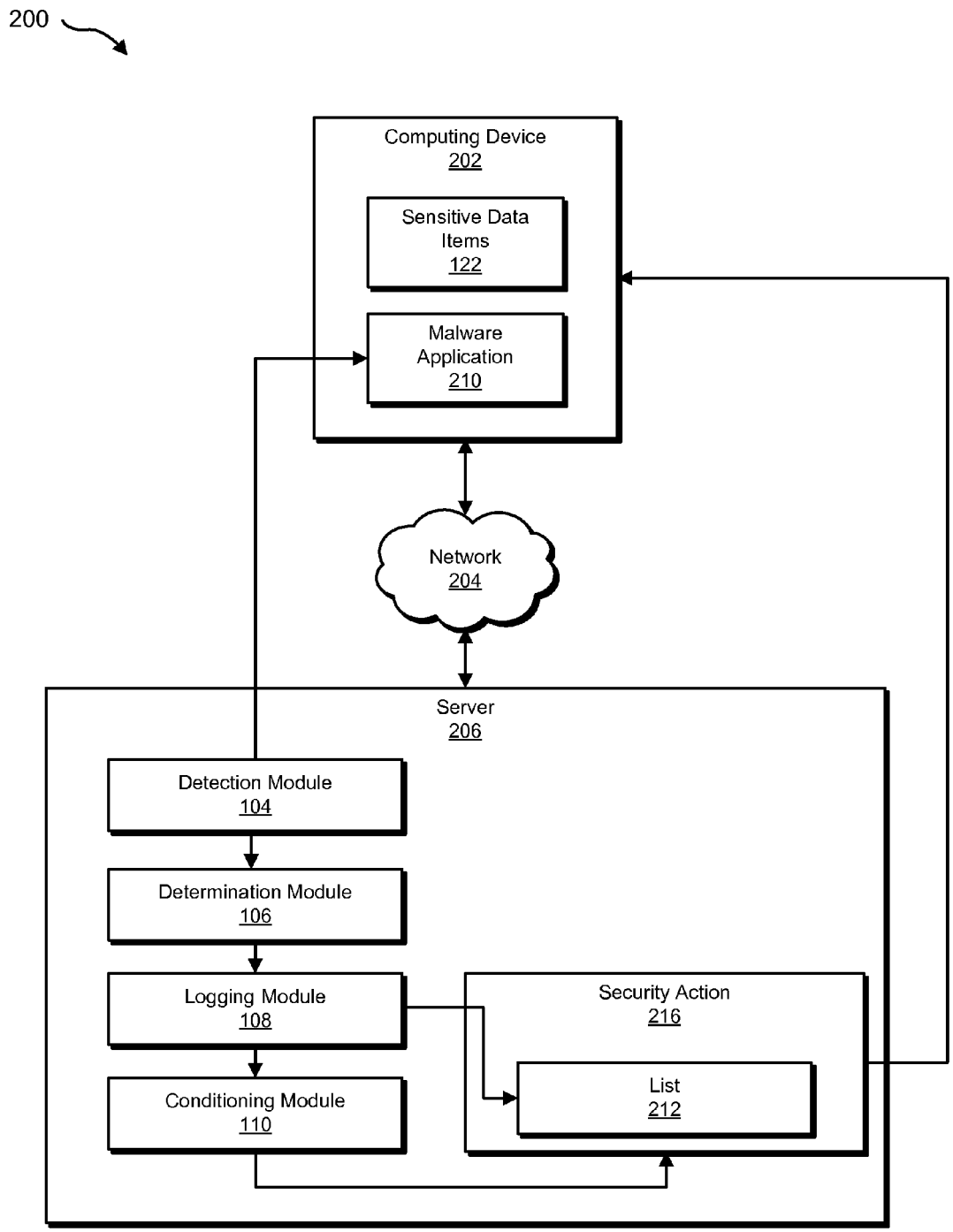
FIG. 2 is a block diagram of an additional exemplary system for reporting security vulnerabilities.

The following will provide, with reference to FIGS. 1-2, detailed descriptions of exemplary systems for reporting security vulnerabilities. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for reporting security vulnerabilities. As illustrated in this figure, exemplary system 100 may include one or more modules 102 for performing one or more tasks. For example, and as will be explained in greater detail below, exemplary system 100 may also include a detection module 104 that may detect that a malware application is present on an endpoint computing system. Exemplary system 100 may additionally include a determination module 106 that may determine a window of time during which the malware application was present in a specified condition on the endpoint computing system. Exemplary system 100 may also include a logging module 108 that may log a list of sensitive data items accessed during the window of time. Exemplary system 100 may additionally include a conditioning module 110 that may condition performance of a security action to report the list of sensitive data items on a determination that both (A) a length of the window of time is longer than a security threshold length and is indicative of the malware application being located on the endpoint computing system long enough to potentially compromise a sensitive data item and (B) the malware application was accessed during the window of time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store sensitive data items 122. As used herein, the term "sensitive data items" generally refers to any item of data that a user may desire to keep private or protect from compromise. Examples of sensitive data items include security credentials and personally identifiable information, as well as financial, medical, and/or educational records, etc. As used herein the term "security credentials" generally refers to usernames, passwords, challenge-response questions, challenge-response answers, and/or any other information used for authentication in a security or authentication process.

Moreover, as used herein, the term "personally identifiable information" generally refers to any information that identifies, by itself, or in combination with other information, an individual associated with, or specified by, the information (e.g., information that makes a substantial contribution to the identification of the individual). Examples of personally identifiable information may include a name (first, middle, and/or last), address (home and/or business), email address, national identification number, IP or network address, vehicle registration plate number, driver's license number, passport number, information that identifies a person's facial appearance, fingerprints, and/or handwriting, credit card or other financial numbers, digital identity, date of birth, birthplace, genetic information, telephone number, security credentials (as discussed above), race or ethnic background, alma mater, job title or description, and/or criminal record. Database 120 may also be configured to store log information 124, which may log activity associated with sensitive data items 122, for example.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to report security vulnerabilities. For example, and as will be described in greater detail below, detection module 104 may detect that a malware application 210 is present on an endpoint computing system, such as computing device 202. Determination module 106 may determine a window of time 402 (as further shown in FIG. 4 and discussed below) during which malware application 210 was present in a specified condition on the endpoint computing system. Logging module 108 may log a list 212 of sensitive data items 122 accessed during window of time 402. As a last example, conditioning module 110 may condition performance of a security action 216 to report list 212 of sensitive data items 122 on a determination that both (A) a length of window of time 402 is longer than a security threshold length 410 (as further shown in FIG. 4 and discussed below) and is indicative of malware application 210 being located on the endpoint computing system long enough to potentially compromise a sensitive data item and (B) malware application 210 was accessed during window of time 402.

In the example of FIG. 2, a user at computing device 202 may protect computing resources with an antivirus product, which may constitute all or part of system 100. The antivirus product may detect the presence of malware application 210. Accordingly, the antivirus product may determine a window of time during which the malware application presented a threat. The antivirus product may similarly determine whether the user should be informed of recommendations for remedial action (e.g., based on the satisfaction of the two conditions outlined above and discussed below for step 308 of FIG. 3). Thus, in addition to detecting and removing a malware threat, the antivirus product may also alert the user with a comprehensive list of sensitive data items for the user to update or otherwise protect in response to the security breach.

In the example of FIG. 2, all of modules 102 are located server-side at server 206. In other examples, any permutation of modules 102 may be located client-side at computing device 202 and/or be shared between server 206 and computing device 202.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of discovering security threats and/or reporting recommendations for remedial action in response to a security breach. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
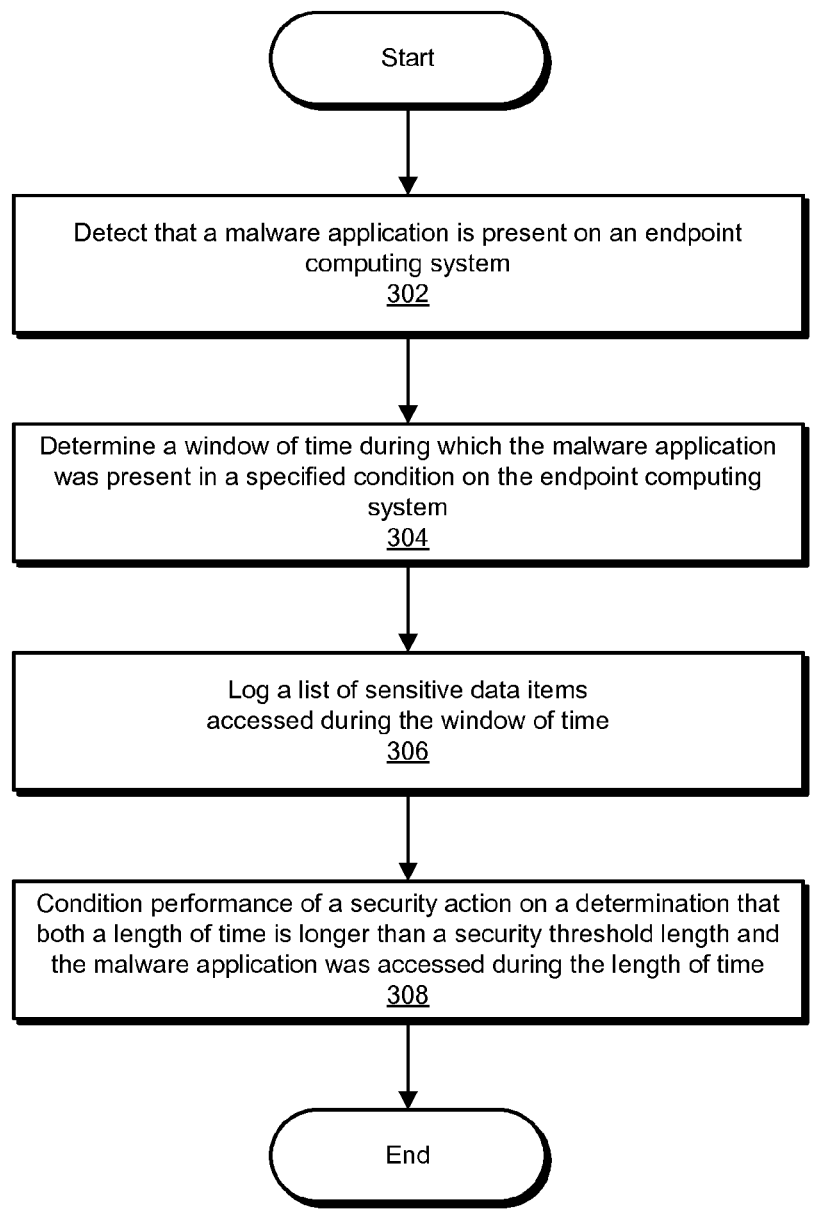
FIG. 3 is a flow diagram of an exemplary method for reporting security vulnerabilities.

FIG. 3 is a flow diagram of an exemplary computer-implemented method 300 for reporting security vulnerabilities. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect that a malware application is present on an endpoint computing system. For example, at step 302 detection module 104 may, as part of server 206 in FIG. 2, detect that malware application 210 is present on an endpoint computing system.

As used herein, the term "malware application" generally refers to any program, script, macro, or series of software steps that, when executed, compromises the security of a computing system. For example, malware applications may degrade computing performance, breach privacy, engage in surveillance, coopt resources, modify data without permission, annoy and harass users, or otherwise compromise computer security.

Moreover, as used herein, the term "endpoint computing system" generally refers to (1) a computing system that potentially would benefit from a security system, program and/or product and/or (2) a computing system used by a human user.

Detection module 104 may detect that the malware application is present in a variety of ways. For example, detection module 104 may scan for the presence of malware. In one specific example, detection module 104 may scan files, registry entries, file metadata, processes, threads, and/or memory pages for presence of malware. Detection module 104 may also scan for indirect presence of malware. For example, detection module 104 may scan for a degradation in computing resource performance (e.g., a speed, power consumption, computation power, and/or memory space or other resource performance), the presence of annoying or harassing features, and/or a breach of a security protocol. Similarly, detection module 104 may scan for the presence of signatures, structures, fingerprints (e.g., hashes), filenames, file metadata, and/or behaviors known to be associated with malware.

Figure 4:
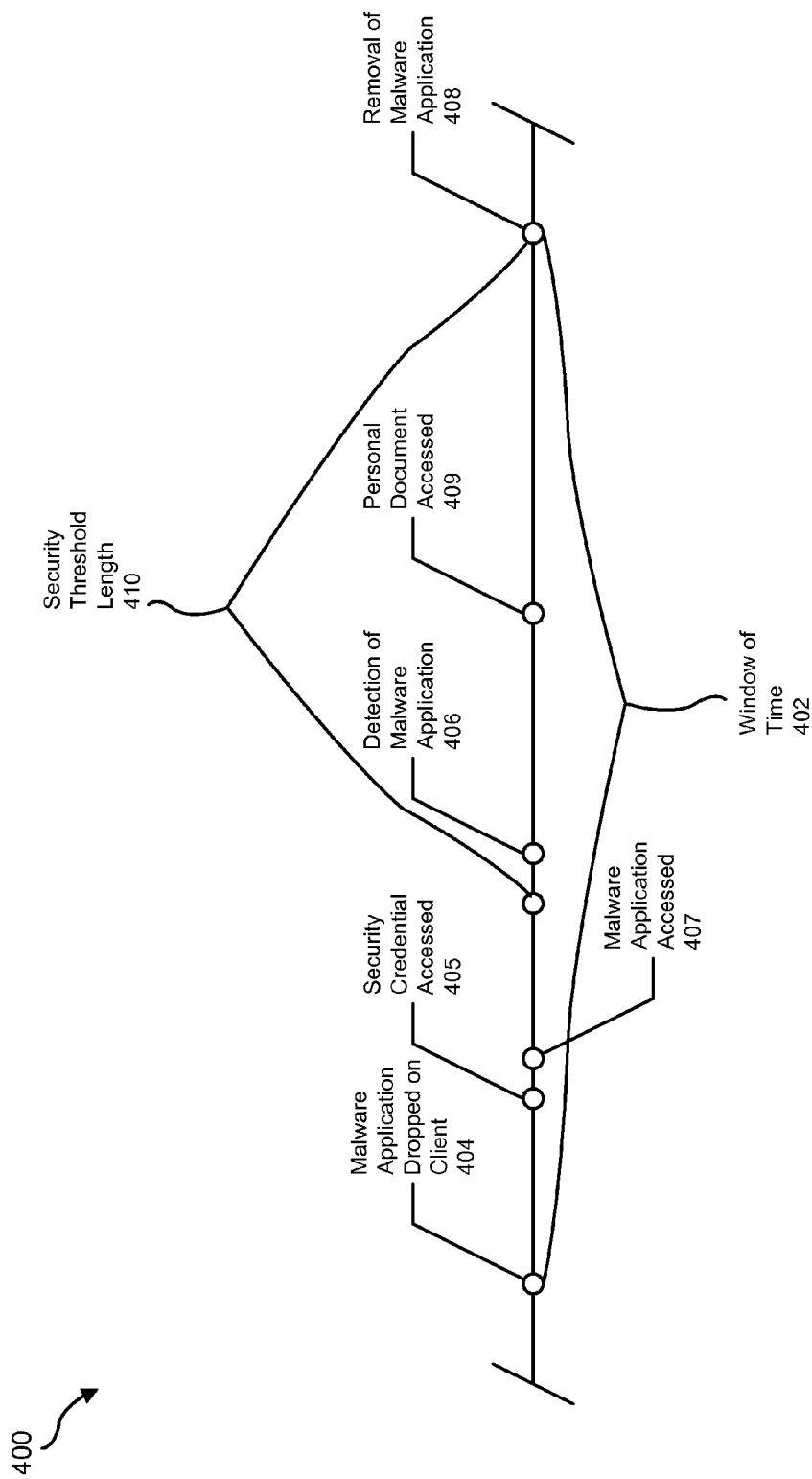
FIG. 4 is a block diagram of an exemplary timeline for reporting security vulnerabilities.

FIG. 4 shows an exemplary timeline 400 corresponding to systems and methods for reporting security vulnerabilities. As shown in FIG. 4, at a point 406 detection module 104 may detect that the malware application is present on computing device 202.

Returning to FIG. 3, at step 304 one or more of the systems described herein may determine a window of time during which the malware application was present in a specified condition on the endpoint computing system. For example, at step 304 determination module 106 may, as part of server 206 in FIG. 2, determine window of time 402 during which malware application 210 was present in a specified condition on the endpoint computing system.

As used herein, the term "window of time" generally refers to a portion of chronological time defined by one or two points, which may be absolute or relative. In some examples, one point may be open ended (e.g., the beginning of time or the end of time) and/or defined by a default, functional, and/or rolling value (e.g., the present time). In further examples, one point may be defined directly in chronological terms (an hour, minute, second, calendar day, day of the week, and/or year, etc.) and/or defined indirectly in functional terms (e.g., marked by a security event or other computing activity).

Moreover, as used herein, the phrase "was present in a specified condition" generally refers to the malware program being in a particular condition such that the condition poses a security threat to a user. For example, the condition may be that the malware program (1) is simply located on computing device 202, (2) is located in a specified portion of auxiliary memory (e.g., an absolute or relative file path), (3) is installed on computing device 202, (4) is loaded into primary memory, (5) is executed, (6) is attempting to infiltrate, infect, and/or affect computing device 202, (6) has been accessed, activated, and/or activated at least once, and/or (7) is performing one or more threatening functions (e.g., the malware program is accessing other areas of memory than its own, performing a specific malware function as opposed to a benign function or remaining dormant, and/or accessing locations across network 204).

Determination module 106 may determine the window of time in a variety of ways. In general, determination module 106 may determine a beginning and/or an end of the window of time. For example, a beginning point may mark when (1) a message containing the malware application (or a reference to the same) was sent to, and/or received at, computing device 202, (2) the malware application was stored to memory, (3) the malware application was installed, and/or (4) the malware application was executed, etc. Returning to FIG. 4, determination module 106 may determine that window of time 402 begins at a specific point 404 when the malware application is dropped on a client.

Similarly, an end point may mark when (1) the malware application was stopped from executing, (2) the malware application was removed, (3) the malware application was neutralized, (4) the malware application was deleted, and/or (5) the malware application was uninstalled, etc. In the example of FIG. 4, determination module 106 may determine that window of time 402 ends at another point 408 when the malware application is removed. In general, determination module 106 may also determine the end point before the malware application is neutralized, in which case the end point may become the present time or substantially the present time (e.g., a time at which determination module 106 makes the determination or identifies the beginning point of the window of time). In these examples, determination module 106 may determine window of time 402 simply by identifying the beginning point without separately identifying an end point (i.e., because the end point is assumed as the current time).

In general, determination module 106 may determine the window of time by determining when the malware application arrived at computing device 202 and how long the malware application was present before being neutralized (or the user was otherwise protected from the malware application). For example, determination module 106 may scan logs of file system operations, auxiliary (or other) memory operations, operating system operations, and/or network messages, etc., to determine when the malware application arrived. In these examples, determination module 106 may discover that a particular file is malicious, such as at point 406 when the malware application is detected, and reclassify the file (or newly classify the file) as malicious. Determination module 106 may then determine when the reclassified file (or newly classified file) first arrived on computing device 202.

At step 306 one or more of the systems described herein may log a list of sensitive data items accessed during the window of time. For example, at step 306 logging module 108 may, as part of server 206 in FIG. 2, log list 212 of sensitive data items 122 accessed during window of time 402. As used herein, the term "log" generally refers to a list or report of items. In general, list 212 may include the results of one or more security scans or reports (e.g., showing all or substantially all items found in the scan or reporting).

Logging module 108 may log the list of sensitive data items in a variety of ways. In general, logging module 108 may monitor activity at computing device 202. Logging module 108 may monitor activity regardless of whether a malware application has been detected (e.g., detected yet). In one example, logging module 108 may log authentication events where a user authenticates herself (e.g., using security credentials). Logging module 108 may log authentication events for secure documents, secure websites, secure applications, and/or any other module or resource that provides an authentication procedure or portal for security. Thus, the list of sensitive data items may include a list of protected resources into which a user logged.

In another example, logging module 108 may log any interaction with documents, such as predetermined documents (or types of documents), including financial, health, educational, encrypted, and/or confidential documents. Thus, the list of sensitive data items may include a list of documents with which a user interacted. Similarly, logging module 108 may log any interaction with personally identifiable information contained within any document or other file or object. For all the above examples, logging module 108 may log any attempt, any unsuccessful attempt, any partial attempt, and/or any successful or completed attempt at authentication. Logging module 108 may log any information or details about any of the above events, including date, time, permissions, file locations, and/or file modifications, etc.

At step 308 one or more of the systems described herein may condition performance of a security action to report the list of sensitive data items on a determination that both (1) a length of the window of time is longer than a security threshold length and is indicative of the malware application being located on the endpoint computing system long enough to potentially compromise a sensitive data item and (2) the malware application was accessed during the window of time. For example, at step 308 conditioning module 110 may, as part of server 206 in FIG. 2, condition performance of security action 216 to report list 212 of sensitive data items 122 on a determination that both (1) a length of window of time 402 is longer than security threshold length 410 and is indicative of malware application 210 being located on the endpoint computing system long enough to potentially compromise a sensitive data item and (2) malware application 210 was accessed during window of time 402.

As used herein, the phrase "condition performance of a security action [ . . . ] on a determination" generally refers to checking to verify that the determination is true within a security system that is configured such that the security system will only perform the security action if the determination is true (i.e., it is true that both (1) a length of window of time 402 is longer than security threshold length 410 and (2) the malware application was accessed during window of time 402). If either condition is false, then the security system, such as system 100, may not perform the security action.

Moreover, as used herein, the term "security threshold length" generally refers to a predefined length of time that marks an amount of time beyond which the malware application may have compromised a sensitive data item (i.e., with a reasonable degree of certainty, probability, and/or expectation). Similarly, as used herein, the phrase "accessed during the window of time" generally refers to the malware program being accessed by a user or computing system in a manner that indicates activity or potentially threatening behavior, such as by being opened, read, modified, loaded into memory, double-clicked on, and/or executed, as opposed to lying dormant in auxiliary memory or other storage. In general, the security threshold length may be sufficiently short to identify detection events that occur upon, immediately upon, and/or substantially immediately upon an infection or arrival of malware on a computing device (e.g., less than one hour, one minute, one second, one deci-second, one centi-second, one milli-second, etc.)

Furthermore, as used herein, the term "security action" generally refers to specific actions that a computing device may perform to inform a user about sensitive data items that are potentially compromised and/or to enable the user to take remedial action. Notably, the existence of one specific security action (e.g., in step 308) to be performed if both conditions are satisfied does not prevent other security actions, or notification actions, from being performed if both conditions are not satisfied, as discussed further below.

Conditioning module 110 may condition performance of the security action in a variety of ways. In some examples, conditioning module 110 may condition performance of the security action by determining that at least one condition is not satisfied. In some examples, conditioning module 110 may determine that length of window of time 402 is not longer than security threshold length 410. In the example of FIG. 4, window of time 402 is actually longer than security threshold length 410. If, however, window of time 402 was not longer than security threshold length 410, then conditioning module 110 may decline to perform the security action, as discussed above.

In another example, conditioning module 110 may determine that at least one condition is not satisfied by determining that the application was not accessed during the window of time. In the example of FIG. 4, conditioning module 110 may actually determine that the malware application was accessed at a point 407 within window of time 402. In contrast, if the malware application had not been accessed, then conditioning module 110 may decline to perform the security action, as discussed above. Conditioning module 110 may determine whether the malware application was accessed in any manner that parallels those outlined above, such as by analyzing logs of executable, program, process, thread, and/or memory activity prepared by logging module 108, etc.

In further examples, conditioning module 110 may report to a user, in response to determining that at least one condition is not satisfied: (1) the detection of the malware application and/or (2) a safety message indicating that the user has a measure of safety from the malware application. If either check fails, then the malware was not present long enough and/or was not ever activated, such that the application may not have ever posed a substantial threat to computing device 202. Accordingly, conditioning module 110 may report that the user is substantially safe and/or that no further remedial actions are needed or helpful. Conditioning module 110 may also report which check(s) failed, and/or the details associated with the check(s) failing, thereby explaining to the user why the user is substantially safe and no further actions are appropriate.

Notably, conditioning module 110 may perform the following checks in any order: (1) whether a length of the window of time is longer than a security threshold length and (2) whether the malware application was accessed during the window of time. Moreover, if either check fails (i.e., is false), then conditioning module 110 may determine that both conditions cannot be true. Conditioning module 110 may, therefore, further determine that the other check is not necessary. In other words, if one check fails, then both checks cannot be true, so performing the other check can be wasteful, because conditioning module 110 conditions the performance of the security action on both checks proving true.

In some examples, conditioning module 110 may condition performance of the security action by determining that both: (1) the length of the window of time is longer than the security threshold length, and (2) the application was accessed during the window of time. Accordingly, conditioning module 110 may determine to actually perform the security action, because both conditions are satisfied. Moreover, list 212 may include a single item, some items, all items, and/or substantially all items (e.g., sensitive data items) accessed during the window of time and/or identified in a security scan.

Figure 5:
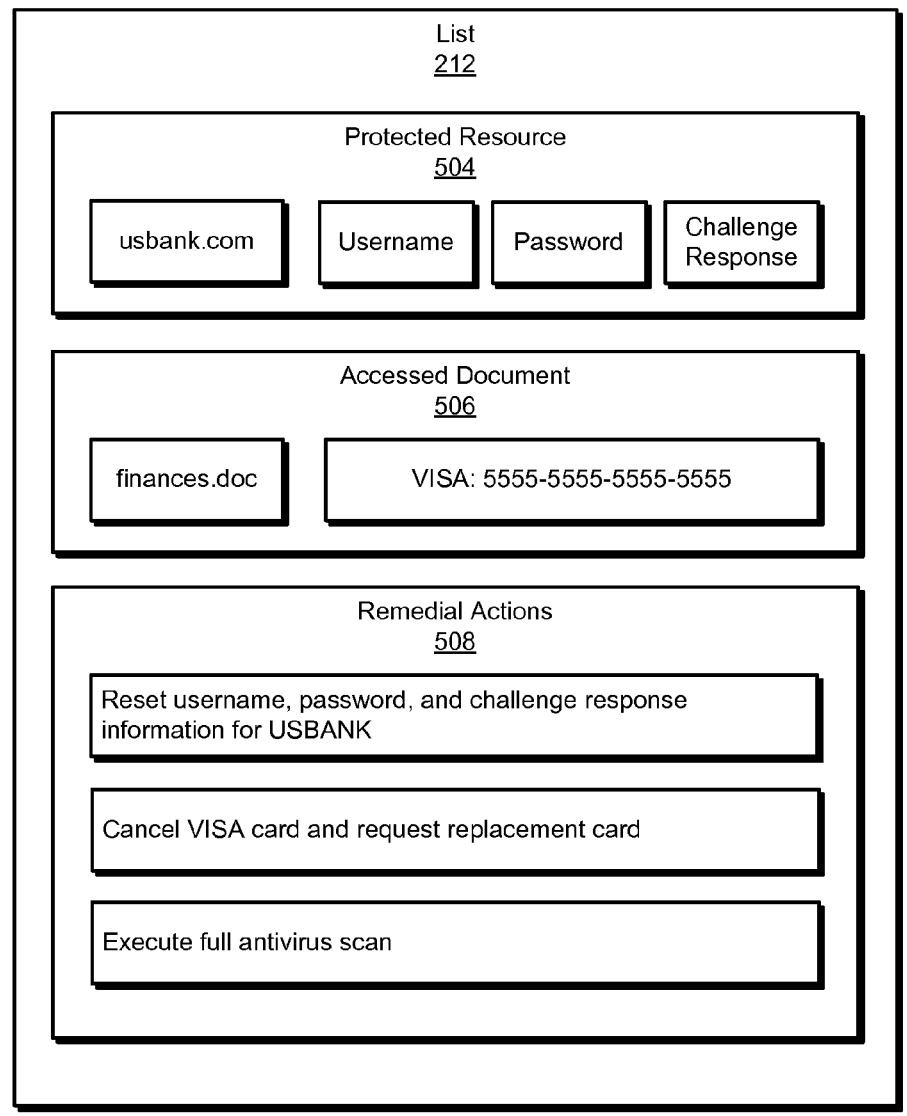
FIG. 5 is a block diagram of an exemplary notification for reporting security vulnerabilities.

FIG. 5 shows an exemplary notification 500 including list 212. In one embodiment, the security action to report the list of sensitive data items may include informing the user to change security credentials for each of the protected resources into which the user logged. For example, as further shown in FIG. 4, a user may have accessed a security credential (e.g., by logging into a protected resource through an authentication procedure) at a point 405. Accordingly, as shown in FIG. 5, lists 212 may show details about a protected resource 504 (e.g., "usbank.com") and corresponding security credentials, such as a username, a password, and/or one or more challenge-response fields.

In a related embodiment, as discussed above, the list of sensitive data items may include a list of documents with which a user interacted. Accordingly, the security action to report the list of sensitive data items may include informing the user that a document in the list of documents was potentially compromised by the malware application. For example, as shown in FIG. 4, a personal document may have been accessed at a point 409. Accordingly, as further shown in FIG. 5, list 212 may include a corresponding accessed document

506. The security action may report the name of the accessed document, such as "finances.doc," as further shown in FIG. 5.

In one embodiment, the security action to report the list of sensitive data items may include scanning documents in the list of documents for personally identifiable information. As used herein, the term document includes any item of data substantially storing text for human reading, including, for example, word processing documents and PORTABLE DOCUMENT FORMAT documents. In other examples, conditioning module 110 may scan any set of files, objects, or items of data for personally identifiable information. In some examples, scanning documents in the list of documents for personally identifiable information may include scanning the documents for information that is structured according to a format for at least one type of personally identifiable information. In one embodiment, the format for the type of personally identifiable information may include at least one of: (1) a structure of a credit card number (e.g., ####-####-####-####, as well as fields for expiration date and/or security code), (2) a structure of a social security number (e.g., ###-##-####), (3) a structure of an address (e.g., including fields for street number, street name, city, state, country, and/or zip code, etc.), (4) a structure of a phone number (e.g., ###-###-####), and/or (5) a structure of a date of birth (e.g., including fields for day, month, and/or year).

In some examples, scanning documents in the list of documents for personally identifiable information may include scanning the documents for specific personally identifiable information known to apply to the user. For example, conditioning module 110 may scan the documents for any specific credit card number, a social security number, an address, a phone number, a date of birth, and/or any other item of personally identifiable information (including the examples enumerated above) known to apply to a protected user. Conditioning module 110 and/or another module may store one or more of these items of information in a security system vault and access the vault to perform the scan. Moreover, whenever conditioning module 110 reports potentially compromised personally identifiable information, conditioning module 110 may highlight that information within a local context, document, and/or file where it was located and/or compromised (e.g., visually highlight to a user).

In another embodiment, the security action to report the list of sensitive data items may include reporting a list of remedial actions 508 that a user may take to protect the user in response to detection of the malware application. In the example of FIG. 5, conditioning module 110 may recommend that the user reset the security credentials associated with usbank.com, cancel the VISA card and request a replacement, and/or execute a full antivirus scan. In general, conditioning module 110 may recommend that a user reset security credentials that may have been compromised and/or take actions in response to the potential compromising of personally identifiable information. These remedial actions may include (1) resetting credentials based on the personally identifiable information, (2) altering the personally identifiable information when possible or practical (e.g., changing a phone number or address), (3) increasing security protections on protected resources, documents, and/or related data objects that may have been compromised, such as encrypting, moving, and/or hiding them, (4) increasing monitoring, checking, and/or awareness for security attacks based on the personally identifiable information, and/or (5) reporting the compromise to another party or authority, such as a credit card vendor and/or the government or police.

In some examples, conditioning module 110 may include portals for automating and/or streamlining the performance of any remedial actions (e.g., a portal or option integrated with a financial, private, and/or government authority to perform any of the remedial actions listed above). For example, notification 500 may provide a simple option (e.g., a one-click option) for a user to perform any of these remedial actions, which may be performed in cooperation with a website and/or application for another authority (e.g., a financial or government authority), as discussed above. Conditioning module 110 may similarly report any date, time, file system location, and/or malware detail (name, behavior, origin, etc.) scanned, identified, and/or discussed above for FIGS. 2-4, thereby providing more meaningful explanations and context for the user. In general, list 212 may include any sensitive data item that may have been accessed by a user and/or program during the window of time and/or otherwise accessed in a manner that the malware application may have compromised the sensitive data item (e.g., even if the access was not technically within the window of time, such as if the access was sufficiently close in time to the window of time, according to a predetermined threshold). Moreover, an additional window of time used to compile list 212 may be different than the window of time compared with the security threshold length. The additional window of time may be defined by any permutation of beginning and end points, as discussed above for the window of time. For example, a length of time on which the malware application was present may be compared against the security threshold length, whereas a length of time since the malware application was activated may be used to compile list 212 (e.g., list 212 may not include sensitive data items accessed while the malware application was dormant or before it became activated). List 212 may also include (or be limited to only include) the specific files, documents, resources, and/or sensitive data items that the malware application actually accessed (and/or was known to have accessed) through file system, operating system, hard disk, memory, and/or network operations, calls, and/or packets.

As explained above in connection with method 300 in FIG. 3, the disclosed systems and methods may provide more comprehensive information to a user about detected security events. For example, the disclosed systems and methods may provide techniques for suggesting that users update security credentials and/or personally identifiable information. Moreover, the disclosed systems and methods may intelligently condition the reporting of these suggestions on the satisfaction of at least two conditions, as discussed above, which together indicate that the updating may be appropriate to maintain security.

Figure 6:
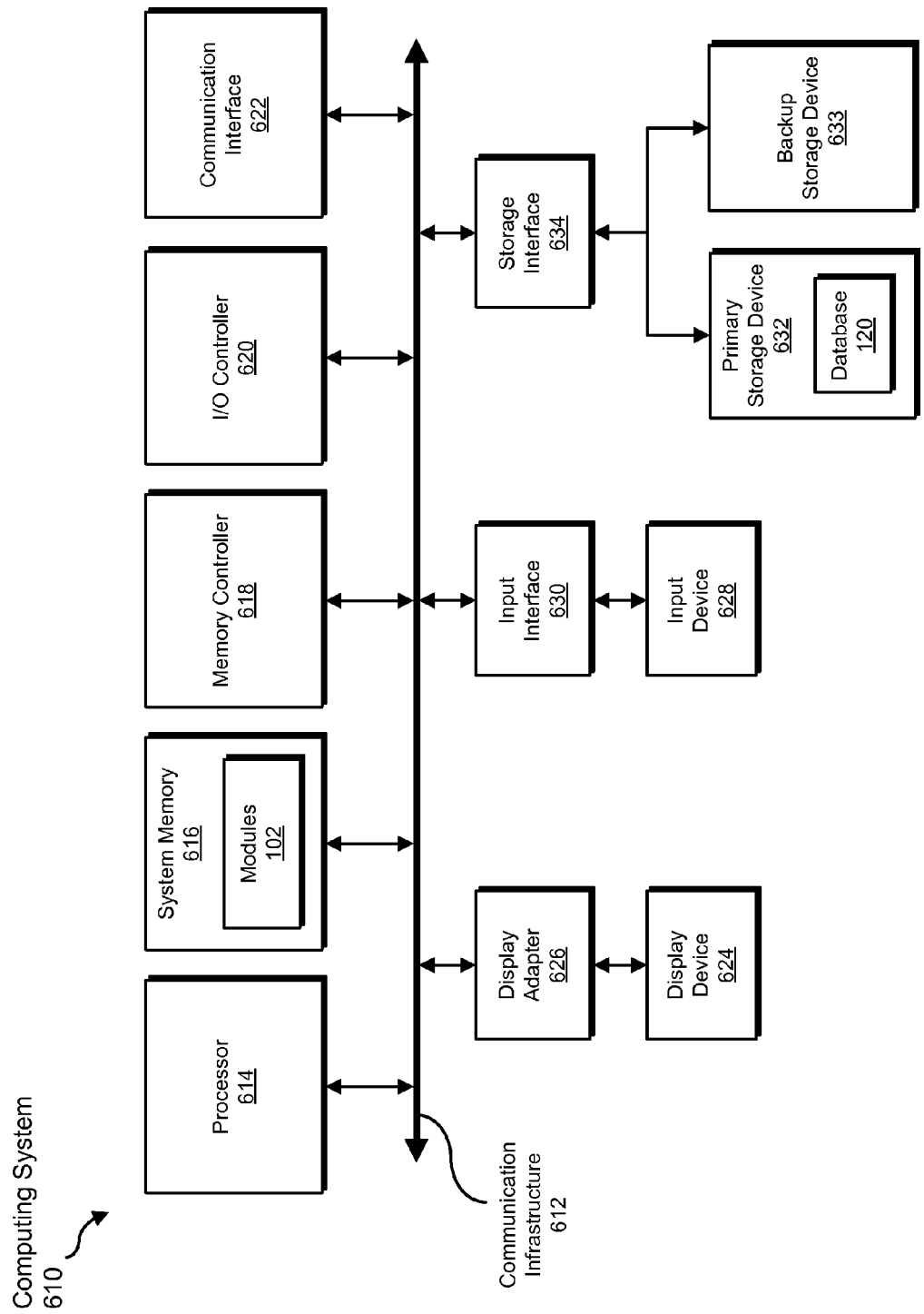
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
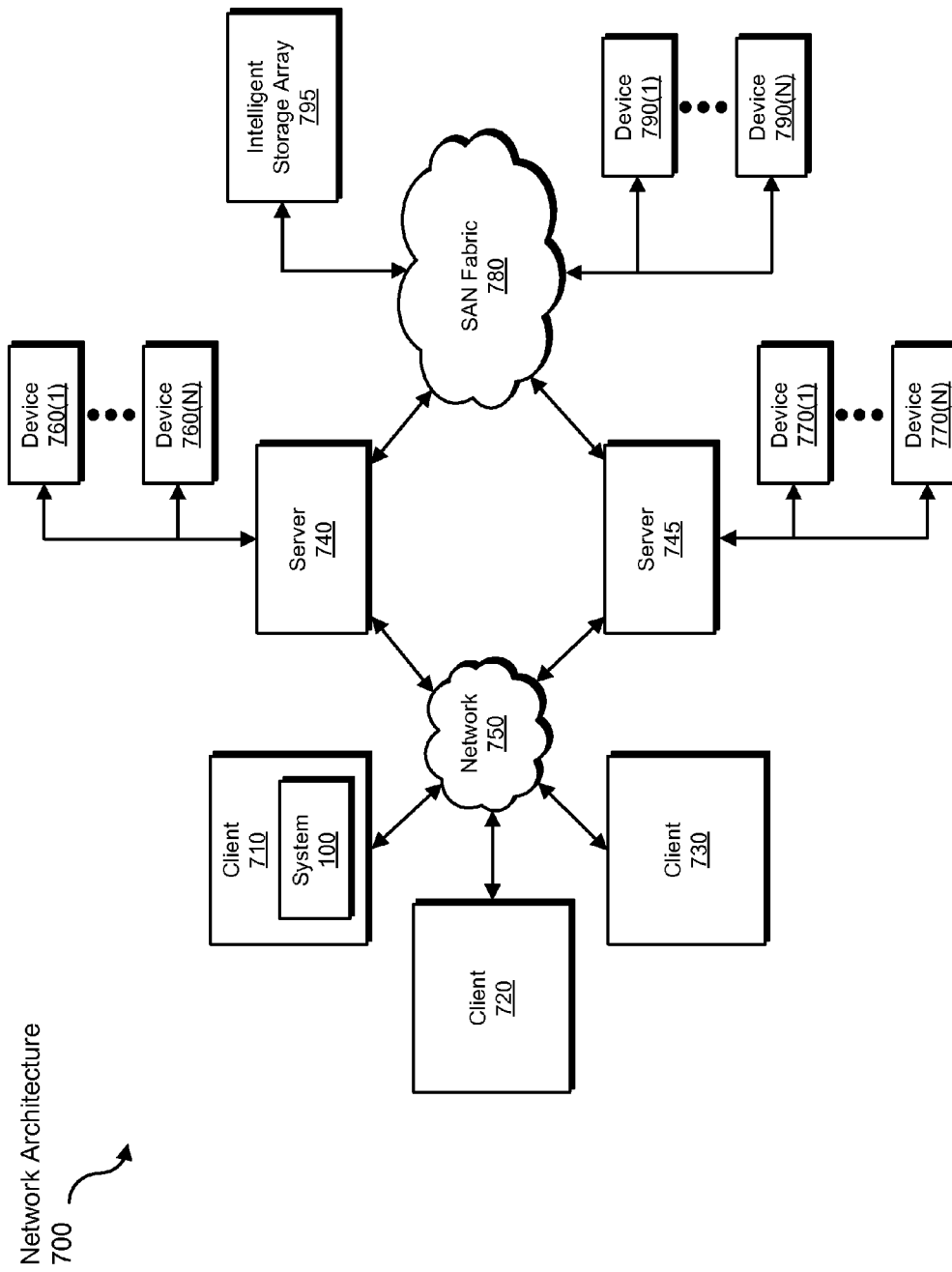
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for reporting security vulnerabilities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a detection of malware, a request for security protection, an insecure computing state, and/or a log of activity made by a security program, to be transformed, transform any permutation of these into a more secure computing state and/or an instruction for performing a security notification, security action, and/or remedial action for a user, output a result of the transformation to an output component (e.g., a display or printer) of a computing device, use the result of the transformation to protect users from malware, and store the result of the transformation to memory or disk. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reporting security vulnerabilities, at least a portion of the method being performed by a computing device comprising at least one processor, the method comprising:
    detecting that a malware application is present on an endpoint computing system;
    determining a window of time during which the malware application was present in a specified condition on the endpoint computing system;
    logging a list of sensitive data items accessed during the window of time;
    performing a security action to report the list of sensitive data items based on a determination that both:
        a length of the window of time is longer than a security threshold length and is indicative of the malware application being located on the endpoint computing system long enough to potentially compromise a sensitive data item;
        the malware application was accessed during the window of time.

2. The computer-implemented method of claim 1, wherein a beginning point of the window of time marks when at least one of:
    a message containing the malware application was sent to the endpoint computing system;
    the malware application was stored to memory;
    the malware application was installed;
    the malware application was executed.

3. The computer-implemented method of claim 1, wherein an end point of the window of time marks when at least one of:
    the malware application was stopped from executing;
    the malware application was removed;
    the malware application was neutralized;
    the malware application was deleted;
    the malware application was uninstalled.

4. The computer-implemented method of claim 1, wherein logging the list of sensitive data items comprises logging authentication events for a set of resources that each provides an authentication procedure for security.

5. The computer-implemented method of claim 1, wherein determining the window of time comprises determining when the malware application arrived at the endpoint computing device.

6. The computer-implemented method of claim 1, wherein determining the window of time comprises determining how long the malware application was present before being neutralized.

7. The computer-implemented method of claim 1, wherein the list of sensitive data items comprises a list of protected resources into which a user logged.

8. The computer-implemented method of claim 7, wherein the security action to report the list of sensitive data items comprises informing the user to change security credentials for each of the protected resources into which the user logged.

9. The computer-implemented method of claim 1, wherein the list of sensitive data items comprises a list of documents with which a user interacted.

10. The computer-implemented method of claim 9, wherein the security action to report the list of sensitive data items comprises informing the user that the documents in the list of documents were potentially compromised by the malware application.

11. The computer-implemented method of claim 9, wherein the security action to report the list of sensitive data items comprises scanning documents in the list of documents for personally identifiable information.

12. The computer-implemented method of claim 11, wherein scanning documents in the list of documents for personally identifiable information comprises scanning the documents for information that is structured according to a format for at least one type of personally identifiable information.

13. The computer-implemented method of claim 12, wherein the format for the type of personally identifiable information comprises at least one of:
    a structure of a credit card number;
    a structure of a social security number;
    a structure of an address;
    a structure of a phone number;
    a structure of a date of birth.

14. The computer-implemented method of claim 11, wherein scanning documents in the list of documents for personally identifiable information comprises scanning the documents for specific personally identifiable information known to apply to the user.

15. The computer-implemented method of claim 1, wherein the security action to report the list of sensitive data items comprises reporting a list of remedial actions that a user may take to protect the user in response to detection of the malware application.

16. A system for reporting security vulnerabilities, the system comprising:
    a detection module, stored in memory, that detects that a malware application is present on an endpoint computing system;
    a determination module, stored in memory, that determines a window of time during which the malware application was present in a specified condition on the endpoint computing system;
    a logging module, stored in memory, that logs a list of sensitive data items accessed during the window of time;
    a conditioning module, stored in memory, that performs a security action to report the list of sensitive data items based on a determination that both:
        a length of the window of time is longer than a security threshold length and is indicative of the malware application being located on the endpoint computing system long enough to potentially compromise a sensitive data item;

the malware application was accessed during the window of time;
at least one physical processor configured to execute the detection module, the determination module, the logging module, and the conditioning module.

17. The system of claim 16, wherein a beginning point of the window of time marks when at least one of:
a message containing the malware application was sent to the endpoint computing system;
the malware application was stored to memory;
the malware application was installed;
the malware application was executed.

18. The system of claim 16, wherein an end point of the window of time marks when at least one of:
the malware application was stopped from executing;
the malware application was removed;
the malware application was neutralized;
the malware application was deleted;
the malware application was uninstalled.

19. The system of claim 16, wherein the logging module logs the list of sensitive data items at least in part by logging authentication events for a set of resources that each provides an authentication procedure for security.

20. A non-transitory computer-readable medium comprising one or more computer-readable instructions that, when executed by at least one processor of a computing device, cause the computing device to:
detect that a malware application is present on an endpoint computing system;
determine a window of time during which the malware application was present in a specified condition on the endpoint computing system;
log a list of sensitive data items accessed during the window of time;
performs a security action to report the list of sensitive data items based on a determination that both:
a length of the window of time is longer than a security threshold length and is indicative of the malware application being located on the endpoint computing system long enough to potentially compromise a sensitive data item;
the malware application was accessed during the window of time.

* * * * *